United States Patent Office 2,968,677
Patented Jan. 17, 1961

2,968,677
PURIFICATION OF ISOPHORONE

Maurice William Fewlass, Hull, England, assignor to The Distillers Company Limited, Edinburgh, Scotland, a British company No Drawing. Filed Oct. 24, 1958, Ser. No. 769,282
Claims priority, application Great Britain Nov. 12, 1957

5 Claims. (Cl. 260—586)

The present invention relates to the purification of isophorone.

It is known that isophorone may be prepared from acetone, for example by heating it at a superatmospheric pressure in the presence of an alkaline catalyst. The isophorone produced, however, may have an undesirably strong yellow colour.

It is an object of the invention to provide a process of decolorizing isophorone.

According to the present invention, the process of decolorizing coloured isophorone comprises mixing coloured isophorone with an aromatic sulphonic acid and distilling isophorone from the mixture.

The coloured isophorone decolorized by the process may be a crude product containing about 80% by weight of isophorone which is obtained by heating acetone at a superatmospheric pressure in the presence of an alkaline catalyst. The isophorone used may contain water. Coloured isophorone from other sources may be decolorized by the invention.

The decolorization may be arranged to take place independently of or in conjunction with other purification of the isophorone. The treatment of the isophorone may be carried out at any convenient stage of the purification. For instance, the acid may be added to wet isophorone, which may then be purified and dried by distillation. Alternatively, the acid may be added to the dry isophrone, which may then be distilled.

The aromatic sulphonic acid used in the process of the invention is preferably toluene para-sulphonic acid, although other sulphonic acids such as sulphanilic acid may also be employed. The proportion of the aromatic sulphonic acid present in the mixture with the isophorone is conveniently arranged to be less than about 1% by weight, preferably from 0.01% to 0.5% by weight, based on volume of the isophorone.

The isophorone may be distilled from the mixture containing the aromatic sulphonic acid by using any suitable type of distillation column; preferably a fractionating column is used. Preferably, the mixture of the isophorone and the aromatic sulphonic acid is heated to a temperature in the range from 80° to 160° C. to effect the distillation.

While the decolorization of the isophorone according to the invention may be carried out virtually to completion, so that a substantially colourless product is obtained, the process may be operated if desired so that the isophorone is only partly decolorized.

The process of the invention may be carried out batchwise. It may also be carried out in a partly continuous manner, for example by continuously distilling the mixture of isophorone and the aromatic sulphonic acid.

Isophorone is a known substance having useful solvent properties; it is, for example, used as a solvent in the production of printing links.

The following examples are given to illustrate further the process of the invention. Parts by weight shown therein bear the same relationship to parts by volume as do kilograms to litres. The colour of the isophorone was measured in the Lovibond tintometer using a 1 inch cell.

Example 1

Crude wet isophorone, produced by subjecting acetone to a superatmospheric pressure in the presence of an alkali catalyst, was separated from water by distillation at 15–20 millimetres pressure.

The dry crude isophorone thus obtained was mixed with toluene para-sulphonic acid to give a mixture contianing 0.1% by weight of toluene para-sulphonic acid based on the volume of the isophorone. This mixture was fed at a rate of 60 parts by volume per hour at a point about one-third of the way up a vertical column packed with Raschig rings; a kettle having an outlet, was provided at the base of the column, which was also fitted with a vapour-splitting reflux head. When the column had reached a steady state the kettle temperature was maintained at 135° C. with a still head temperature in the range from 87° C to 90° C., a reflux ratio of 1:1, and a pressure of 10 millimetres of mercury. The colour of the isophorone obtained was 0.8 unit (yellow).

Example 2

Crude wet isophorone was mixed with toluene para-sulphonic acid to give a mixture containing 0.2% by weight of toluene para-sulphonic acid based on the volume of the isophorone. This mixture was separated from water by distillation at 15 to 20 millimetres pressure for 45 minutes. The dry material was distilled in the distillation apparatus described in Example 1, with a feed rate of 75 parts by volume per hour, a kettle temperature of 120° to 140° C., a still head temperature of 80° to 85° C. a reflux ratio of 1:1 and a pressure of from 15 to 20 millimetres of mercury. The colour of the isophorone obtained was 0.2–0.5 unit (yellow).

Example 3

Wet, crude isophorone was mixed with toluene para-sulphonic acid to give a mixture containing 0.1% by weight of toluene para-sulphonic acid based on the volume of the isophorone. This mixture was treated by the process described in Example 2 using a feed rate of 85 parts by volume per hour, a kettle temperature of 130° to 135° C., a still head temperature of 89° to 91° C., a reflux ratio of 1:1 and a pressure of 10 millimetres of mercury.

The isophorone obtained had a yellow colour of 0.5 unit.

Example 4

The procedure described in Example 3 was followed using a mixture of isophorone and toluene para-sulphonic acid containing 0.5% by weight of toluene para-sulphonic acid based on the volume of the isophorone. The feed rate was 60 parts by volume per hour, the kettle temperature was 135° C., and the still head temperature was 85° to 88° C., the operating conditions being otherwise the same.

The isophorone obtained had a yellow colour of 0.7 unit.

Example 5

The procedure described in Example 3 was followed except that sulphanilic acid was mixed with the crude, wet isophorone to give a mixture containing 0.2% by weight of sulphanilic acid based on the volume of the isophorone. This mixture was maintained at 100° C., for an hour and then dehydrated and filtered. The feed rate was 100 parts by volume per hour, the kettle temperature was 140° to 150° C., the still head temperature was 82° to 98° C., the reflux ratio was 3:1, and the pressure varied between 5 and 20 millimetres of mercury.

The isophorone obtained had a yellow colour of 1.6 units.

In contrast with the process of the present invention as illustrated in the above Examples 1 to 5, the procedure described in Example 3 was repeated in the absence of an aromatic sulphonic acid; the feed rate was 80 parts by volume per hour, the kettle temperature was 140° to 158° C., the reflux ratio was 1:1 and the pressure was 10 millimetres of mercury. The isophorone obtained had a yellow colour of 3.3 units. In a similar run, using a feed rate of 50 parts by volume per hour and a kettle temperature of 115° to 158° C., the isophorone obtained had a yellow colour of 3.9 units.

I claim:

1. A process of decolorizing colored isophorone which comprises mixing colored isophorone with an aromatic sulphonic acid selected from the group consisting of toluene para-sulphonic acid and sulphanilic acid, and distilling isophorone from the mixture.

2. A process of decolorizing colored isophorone which comprises mixing colored isophorone with less than about 1%, but at least 0.01%, by weight of an aromatic sulphonic acid selected from the group consisting of toluene para-sulphonic acid and sulphanilic acid, based on the volume of the isophorone and distilling isophorone from the mixture.

3. A process of decolorizing colored isophorone which comprises mixing colored isophorone with less than about 1%, but at least 0.01%, by weight, of an aromatic sulphonic acid selected from the group consisting of toluene para-sulphonic acid and sulphanilic acid, based on the volume of the isophorone and heating the mixture at a temperature from 80° to 160° C. to distill isophorone from the mixture.

4. A process of decolorizing isophorone which comprises mixing colored isophorone with less than about 1%, but at least 0.01%, by weight, of toluene para-sulphonic acid based on the volume of the isophorone and distilling isophorone from the mixture.

5. A process of decolorizing isophorone which comprises mixing colored isophorone with less than about 1%, but at least 0.01%, by weight, of sulphanilic acid based on the volume of the isophorone and distilling isophorone from the mixture.

References Cited in the file of this patent

UNITED STATES PATENTS

| | | |
|---|---|---|
| 2,399,976 | Ballard et al. | May 7, 1946 |
| 2,465,475 | Pines et al. | Mar. 29, 1949 |